June 7, 1938. H. C. SNOW 2,119,892
HEADLIGHT STRUCTURE
Filed Jan. 17, 1936 3 Sheets-Sheet 1
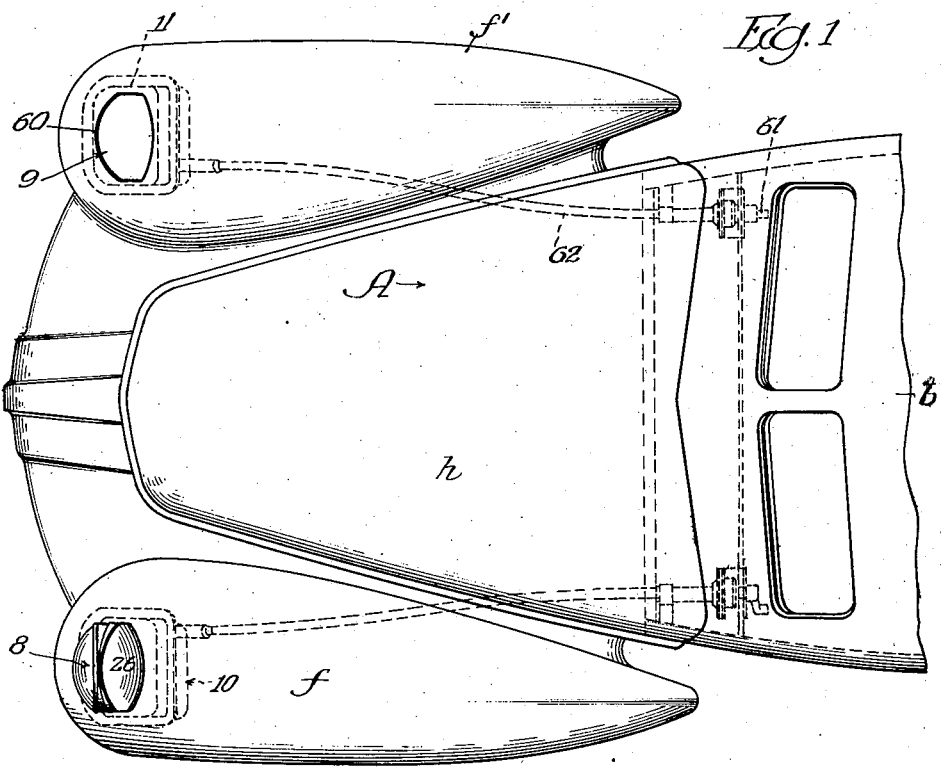
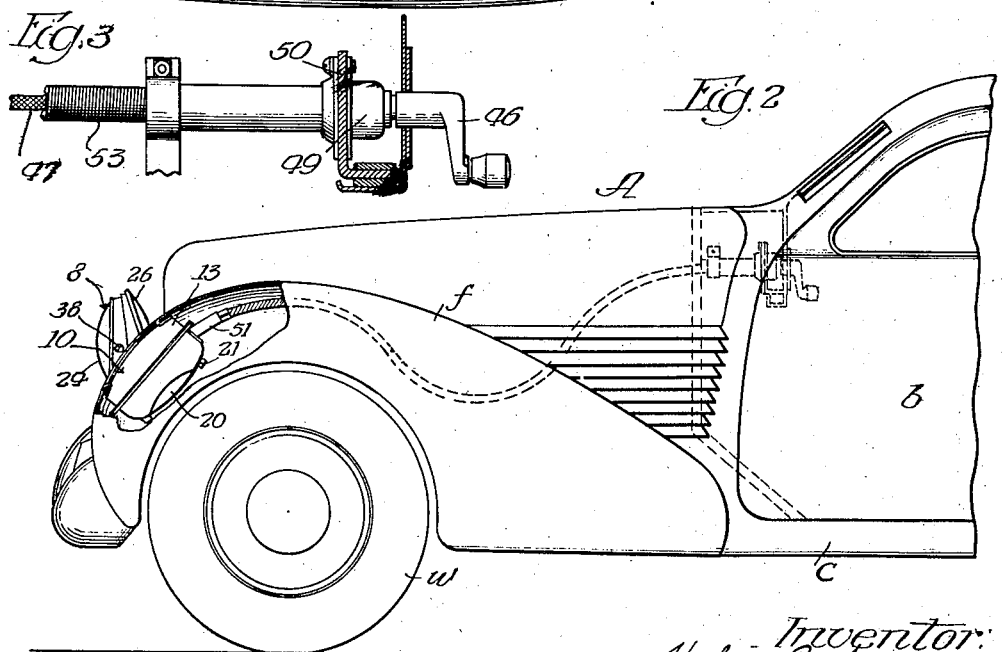
Inventor:
Herbert C. Snow
By Fred Gerlach his Atty.

June 7, 1938.  H. C. SNOW  2,119,892
HEADLIGHT STRUCTURE
Filed Jan. 17, 1936  3 Sheets-Sheet 2
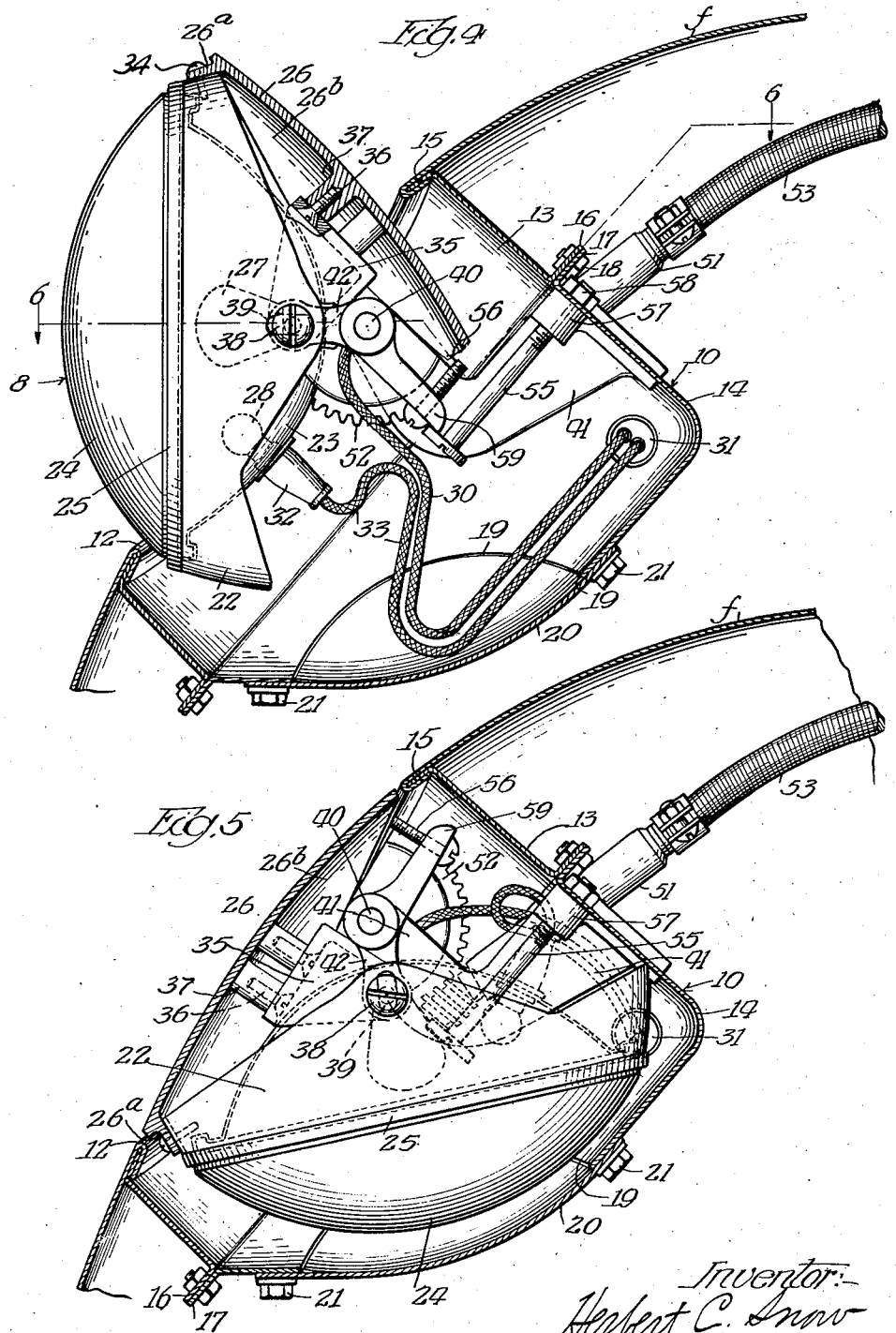

June 7, 1938.  H. C. SNOW  2,119,892
HEADLIGHT STRUCTURE
Filed Jan. 17, 1936   3 Sheets-Sheet 3
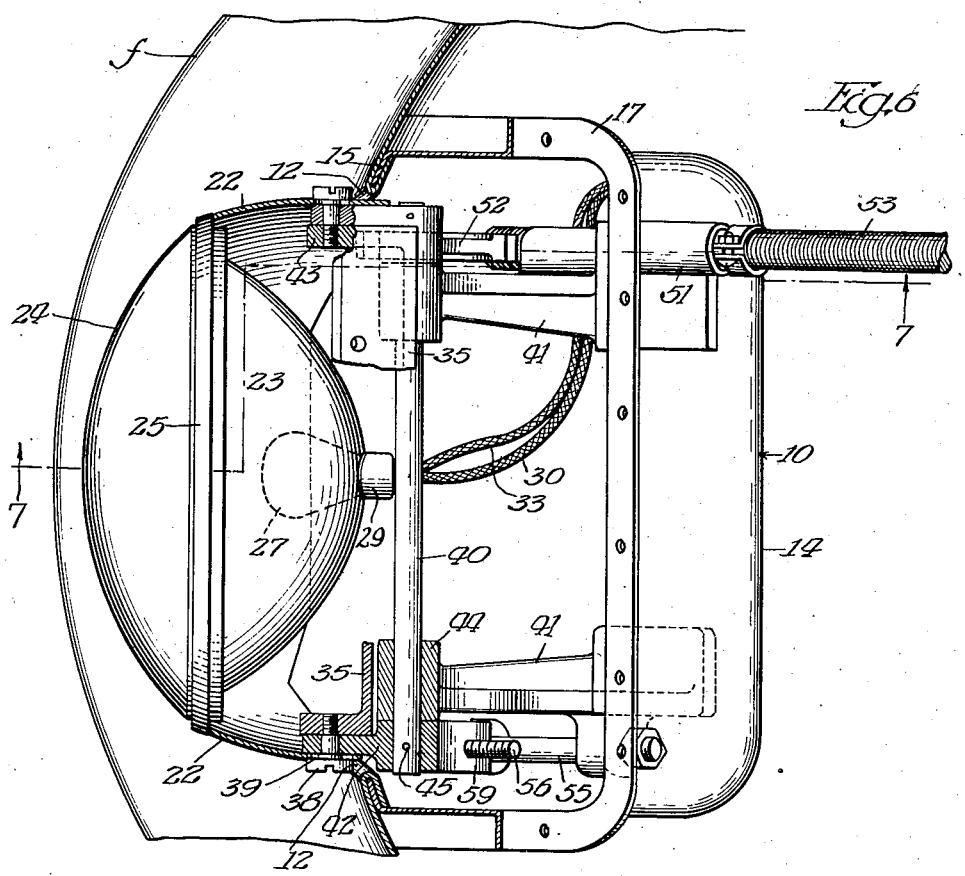
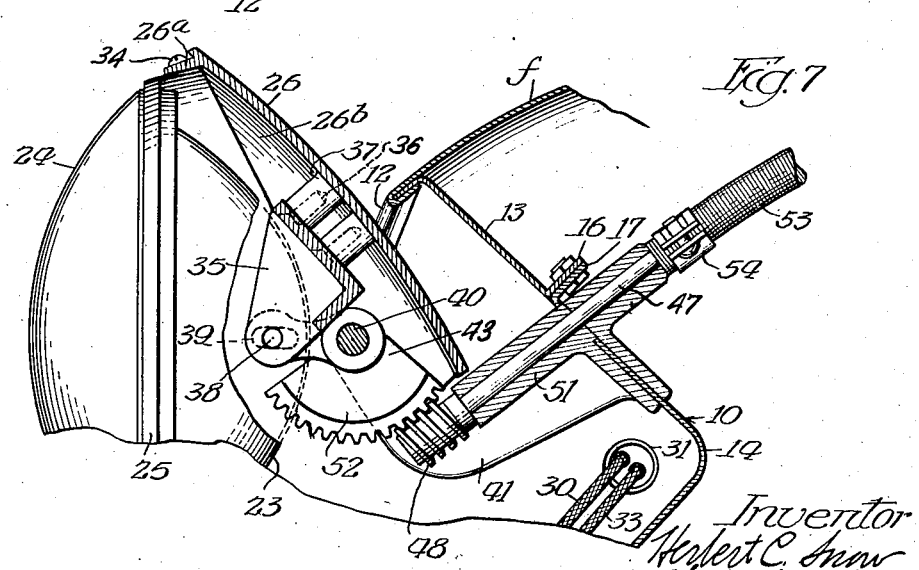

Patented June 7, 1938

2,119,892

UNITED STATES PATENT OFFICE 2,119,892

HEADLIGHT STRUCTURE

Herbert C. Snow, Auburn, Ind., assignor to Auburn Automobile Company, Auburn, Ind., a corporation of Indiana Application January 17, 1936, Serial No. 59,533

10 Claims. (Cl. 240—7.1)

The present invention relates generally to headlight structures. More particularly the invention relates to that type of headlight structure which is used in connection with an automobile and comprises (1) a pair of pockets which are positioned under the front fenders of the automobile and register with openings in such fenders; and (2) a pair of electric lamps which are associated with the pockets and are mounted so that during daytime use of the automobile they may be swung from an operative position outside of the pockets into an inoperative position wherein they are disposed wholly within the pockets and do not offer resistance to the air or accumulate dust or dirt on the lenses thereof.

One object of the invention is to provide a headlight structure of this type in which the lamps are mounted in a novel manner and are individually controlled or operated by means of a pair of cranks which are located on the dashboard of the automobile.

Another object of the invention is to provide a headlight structure of the type and character under consideration which embodies novel and simple means whereby the lamps may be adjusted horizontally one with respect to the other in order to bring the columns of light emanating therefrom into parallelism.

Another object of the invention is to provide a headlight structure of the aforementioned character which embodies adjustable stops for preventing the lamps from being swung past their proper operative position.

Another object of the invention is to provide a headlight structure of the type and character heretofore mentioned in which the lamps embody plates for closing the fender openings when the lamps are in their inoperative position within the pockets and also embody adjustable stop means for preventing the lamps from being swung past or beyond their inoperative position wherein the plates thereof close the fender openings.

A still further object of the invention is to provide a headlight structure of the type under consideration in which the pockets have cover closed holes in the bottom portions thereof whereby any dirt or foreign matter which accumulates within the pockets while the lamps are in their operative position may readily be removed.

Another object of the invention is to provide a headlight structure which is both novel in design and efficient in operation and is an improvement upon that which is shown in Letters Patent of the United States, No. 2,084,120, granted May 15, 1937, to Harold T. Ames.

Other objects of the invention and the various advantages and characteristics of the present headlight structure will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 1 is a fragmentary plan view of an automobile having a headlight structure embodying the invention, one of the lamps of the structure being shown in its operative or open position and the other lamp of the structure being shown in its inoperative or closed position within the pocket with which it is associated;

Figure 2 is a side elevational view of the automobile, parts being broken away and shown in section for illustrative purposes;

Figure 3 is a side view of one of the dashboard-mounted cranks for controlling or manipulating the lamps of the structure;

Figure 4 is a vertical longitudinal sectional view of one of the lamps showing the same in its operative or open position;

Figure 5 is a similar sectional view showing the lamp of Figure 4 in its inoperative position within the pocket therefor;

Figure 6 is a horizontal sectional view on the line 6—6 of Figure 4; and

Figure 7 is a vertical section on the line 7—7 of Figure 6.

The headlight structure which forms the subject matter of the invention is designed and adapted for use in connection with an automobile A. The latter, as shown in Figures 1 and 2, is of standard or conventional design and comprises a body $b$ and a chassis $c$. The chassis underlies and supports the body and has a pair of dirigible wheels $w$ at the front end thereof. The body $b$ comprises a hood $h$ for the engine of the automobile and a pair of fenders $f$ and $f^1$ for the front wheels $w$ of the chassis. The two aforementioned fenders are located at opposite sides of the front end of the hood and each consists of an inner and an outer side wall together with a front wall and a top wall between the two side walls. The front walls of the fenders $f$ and $f^1$ are curved transversely as well as longitudinally thereof and overhang the front portions of the dirigible wheels.

The headlight structure comprises a pair of electric lamps 8 and 9. The latter are located at the front end of the automobile A and operate when current is supplied thereto to direct forwardly beams of light for purposes of illumination. The lamp 8 is associated with the fender f and is hinged or mounted as hereinafter described so that it may be swung downwards from an operative position at the front part of the fender f into an inoperative position wherein it is disposed within a pocket 10 on the under side of the fender. The lamp 9 is associated with the fender f¹ and is hinged or mounted similarly to the lamp 8 so that it may be swung from an operative position at the front of the fender f¹ into an inoperative position wherein it is disposed within a pocket 11 on the under side of the fender f¹. The pocket 10 is positioned over the front portion of the subjacent wheel w and is protected at the sides thereof by the inner and outer side walls of the fender f. It registers with an opening 12 in the upper portion of the front wall of the fender f and consists of a top section 13 and a bottom section 14. The top section 13 is formed of sheet metal and embodies an inwardly extending top flange 15 and an outwardly extending bottom flange 16. The opening 12 is irregularly shaped, as shown in the drawings, and the portion of the front wall of the fender f which defines the opening is doubled back so that it underlies the flange 15 of the upper pocket section 13 and interlocks with said flange in such manner that the top section of the pocket is fixedly or rigidly secured in place beneath the top portion of the front wall of the fender f. The bottom section 14 of the pocket is cup-shaped. It is formed of sheet metal and embodies an out-turned flange 17. The latter underlies and corresponds in shape to the flange 16 of the top section 13 and is connected to the latter by means of bolts 18. A hole 19 is formed in the bottom portion of the bottom section 14 and permits dirt and foreign matter which passes through the opening 12 and accumulates in the pocket to be removed or cleaned from the pocket. This hole 19 is normally closed by a sheet metal cover 20 which is removably secured to the hole defining portion of the bottom section by means of bolts 21. When the latter are removed from the bottom section 14 of the pocket the cover 20 may be removed from said section 14 so as to provide access to the interior of the pocket by way of the hole 19.

The electric lamp 8 consists of a shell 22, a reflector 23, a lens 24, a connecting ring 25, and a plate 26. The reflector is of the parabolic variety and is provided with a bright light bulb 27 and a dim light bulb 28. The bright light bulb is mounted in a socket 29 at the center of the reflector and is supplied with electric current by way of a conductor 30 which is connected to receive current from the storage battery of the automobile, extends through a plug 31 in the upper portion of the bottom section 14 of the pocket, and is attached to the socket 29. The dim light bulb 28 is used when the automobile is being driven at night over a well illuminated roadway or for parking purposes, as well understood in the art. It is positioned beneath the bright light bulb 27 and is mounted in a socket 32. An electric conductor 33 serves to supply current to the bulb 28. This conductor is attached to the storage battery of the automobile and leads into the pocket through the plug 31 and is attached to the socket 32. The shell 22 is formed of sheet metal and surrounds the reflector, as shown in the drawings. The lens 24 is positioned directly in front of the reflector and is secured to the margin of the latter and also to the shell 22 by means of the ring 25. The plate 26 overhangs and is spaced from the reflector and corresponds in size and shape to the opening 12. It is curved conformably to the portion of the fender f around the opening 12 and serves as a cover for the opening when the lamp 8 is in its inoperative or closed position in the pocket 10. By curving the plate in this manner the lamp when in its inoperative position within the pocket 10 offers substantially no resistance to the air encountered during forward drive of the automobile. As shown in the drawings, the plate 26 has what may be termed a depending top flange 26ᵃ and what may be termed a pair of depending side flanges 26ᵇ. The top flange 26ᵃ overlies the top portion of the shell 22 and is secured to the latter by means of a screw 34. The side flanges 26ᵇ lap the side portions of the shell 22 and together with the plate 26 and the top flange 26ᵃ and also the top and side portions of the shell 22 serve to enclose the upper portion of the reflector when the lamp is in its operative or open position (see Figure 4). When the lamp is in this position the lens 24 extends upwardly from the bottom portion of the opening 12 in the fender f and the plate 26 extends downwards and rearwards from the top of the shell 22 and projects past the upper portion of the opening 12 into the top part of the pocket 10. When the lamp is in its aforesaid operative position it is positioned beneath the top portion of the fender and hence offers but a small amount of resistance to the air encountered during drive of the automobile. When the lamp is in its inoperative position within the pocket the lens 24 faces downwards and is positioned in the bottom portion of the pocket (see Figure 5) and the plate 26 closes completely the opening 12. The plate 26 is attached or fixed to the side portions of the shell 22 by means of a horizontally extending, bar-like member 35. This member is attached by means of screws 36 to a pair of bosses 37 on the central portion of the inner face of the plate 26. The end portions of the member 35 extend at right angles to the central portion of said member and are positioned within and directly opposite to the side portions of the shell 22. As shown in Figure 6, screws 38 are carried by the end portions of the bar-like member 35 and extend through slots 39 in the side portions of the shell of the lamp 8. These screws together with the member 35 serve to connect or attach the plate 26 to the shell of the lamp.

The mounting whereby the lamp 8 is pivotally supported so that it may be swung from its operative position into its closed position within the pocket and vice versa comprises a horizontally extending shaft 40 and a pair of bearing brackets 41 for the shaft, and also comprises a pair of elements 42 and 43 which are rotatable with the shaft. The shaft 40 is located in the upper portion of the pocket 10 and is positioned between the central portion of the reflector 23 and the cover 26 of the lamp 8. The bearing brackets 41 are anchored to the top portion of the bottom section 14 of the pocket 10 and are L-shaped in design. They extend downwardly and then forwardly and upwardly, as shown in the drawings, and embody bearings 44 in which the shaft 40 is journaled. The elements 42 and 43 are fixed by pins 45 to opposite ends of the shaft 40 and have parts which project radially from the shaft and fit between the ends of the bar-like member 35 and the contiguous side portions of the shell 22. The screws 38 extend through the aforesaid parts of the rotatable elements 42 and 43 and when tightened serve to hold them in clamped relation with respect to the ends of said bar-like member and the adjacent or contiguous side portions of the shell. The slots 39 through which the screws 38 project extend horizontally when the lamp 8 is in its operative position and as a result when the screws 38 are loosened it is possible to adjust or rotate the lamp about a vertical axis and thus properly set its beam or column of light with respect to the light emanating from the lamp 9. The screws 38 and slots 39 constitute simple means whereby the lamp 8 may be properly adjusted with respect to the lamp 9. By reason of the fact that the shaft 40 is located adjacent to the central portion of the reflector 23 the lamp is centrally pivoted or hinged and hence will not when encountering air as the result of being in its operative position tend to rotate or turn about the shaft. As shown in Figures 4 and 7, the rear portion of the cover 26 of the lamp overhangs the shaft 40 and thus protects it against dirt, rain and snow.

The lamp 8 is shifted into and out of its operative or open position by means of a crank 46, a flexible shaft 47, and a worm 48. The crank 46, as shown in Figure 1, is mounted on the left hand side of the dashboard of the automobile A and is connected to one end of the flexible shaft 47 through the medium of an irreversible clutch 49. The latter is mounted on a bracket 50 behind the dashboard. It is of any suitable or well known construction and operates to lock or hold the shaft 47 against rotation except by the shaft 46. The front end of the flexible shaft 47 extends into the pocket 10 and is journaled in a sleeve 51 which is attached to and extends through a hole in the top portion of the lower section of the pocket 10. The worm 48 is fixed to the extreme front end of the flexible shaft 47 and meshes with a segment type worm gear 52 which forms a part of, and is integral with, the rotatable element 43. When the crank 46 is turned in one direction the shaft 40 as the result of being rotated in one direction by the driving action of the worm 48 and the worm gear 52 swings the lamp 8 upwardly into its operative or open position. When the crank 46 is turned in the opposite direction the worm 48 and the worm gear 52 rotate the shaft 40 reversely and cause the lamp 8 to swing downwards into its inoperative position within the pocket 10. The flexible shaft 47 is encased in a sheath 53. This sheath extends around the exposed portion of the flexible shaft and has the front end thereof connected by a clamp 54 to the outer end of the sleeve 51.

In order to limit the arc of swing of the lamp 8, a screw 55 and a screw 56 are provided. The screw 55 extends alongside of the bracket 41 which is adjacent to the rotatable element 42. The shank of the screw 55 extends through a boss 57 at one side of said bracket and is provided with a lock nut 58. The head of the screw 55 is located in the central portion of the pocket 10 and coacts with a radially extending stop arm 59 on the rotatable element 42 to limit upward swinging of the lamp and stop upward movement of the lamp when it reaches its proper operative position. By adjusting the screw 55 longitudinally the stop means which in general comprises the screw 55 and the stop arm 59 may be set so as to prevent the lamp 8 from swinging upwardly beyond a predetermined point. Said means is adjustable inasmuch as it includes the screw 55. The screw 56 serves to limit downward swinging of the lamp 8. It extends through the outer or distal end of the stop arm 59, as shown in Figures 4 and 5 of the drawings, and coacts with the portion of the fender f which defines the opening 12. When the lamp is swung downwards into its inoperative or closed position the screw 56 abuts against said opening-defining portion of the fender f and precludes further downward swinging of the lamp. By adjusting the screw 56 longitudinally the lamp may be stopped as far as downward swinging thereof is concerned when it reaches a position wherein the cover 26 is in precise registry or alignment with the opening 12 in the fender f. The screw 56 constitutes adjustable stop means for preventing the lamp 8 from being swung past or beyond its proper and operative position.

The lamp 9 is similar in design and construction to the lamp 8 and the pocket 11 is the same as far as construction is concerned as the pocket 10 and is positioned over the front portion of the subjacent wheel w and in registry with an opening 60 in the upper portion of the front wall of the fender $f^1$. As shown in Figure 1 of the drawings, the opening 60 is aligned horizontally with the opening 12. The lamp 9 is supported or mounted in the same manner as the lamp 8 and is swung from its operative position into its closed or inoperative position and vice versa by means of a crank 61 and a flexible shaft 62. The crank 61 is located at the right hand side of the dashboard of the automobile and the flexible shaft 62 leads from the handle to a worm and worm gear driving connection (not shown) for the lamp 9. By employing a crank for each of the lamps 8 and 9 the lamps may be individually controlled and if desired one may be used independently of the other. By locating the cranks at opposite ends of the dashboard one of the cranks may be operated or manipulated by one occupant of the automobile and the other crank may be operated or manipulated by another occupant.

The herein described headlight structure is comparatively simple as far as construction is concerned and may be produced at a low and reasonable cost.

The invention is not to be understood as restricted to the details set forth, since these may be modified within the scope of the appended claims, without departing from the spirit and scope of the invention.

Having thus described the invention, what I claim as new and desire to secure by Letters Patent is:

1. In a headlight structure for a vehicle, the combination of a pocket located at the front of the vehicle and provided with a forwardly and upwardly facing opening, an electric lamp associated with the pocket and comprising a lens and a concavo convex reflector, and a mounting adapted to support the lamp so that it may be swung upwardly from an inoperative position wherein it is disposed wholly within the pocket and the lens thereof faces downwardly into an operative position wherein the lens thereof faces forwardly and is positioned wholly outside of the pocket and the upper portion of the reflector is disposed exteriorly of the pocket opening, and comprising a bearing bracket fixedly mounted in the upper portion of the pocket and a horizontally extending rotatable shaft in the bearing bracket spaced outwardly a small distance from and centrally positioned with respect to the central part of the reflector and connected by rigid arm-like members at the ends thereof to the side parts of the lamp.

2. In a headlight structure for a vehicle, the combination of a pocket located at the front of the vehicle and provided with a front opening, an electric lamp associated with the pocket and comprising a lens, a reflector in back of the lens, and a shell around the reflector, a mounting in the pocket whereby the lamp is supported so that it may be swung upwardly from an inoperative position in the lower portion of the pocket into an operative position wherein the lens thereof projects through the opening and faces forwardly, a plate of the same shape as the opening connected to the top portion of the shell and extending rearwardly and at an acute angle with respect to the lens and arranged so that it serves to close the opening when the lamp is in its inoperative position and further so that when the lamp is swung into its operative position it swings upwardly and the rear portion thereof projects into the pocket and overhangs said mounting, and means for connecting the central portion of the plate to the side portions of the shell.

3. In a headlight structure for a vehicle, the combination of a pocket located at the front of the vehicle and provided with a front opening, an electric lamp associated with the pocket, and comprising a lens, a reflector in back of the lens, and a shell around the reflector, a mounting in the pocket whereby the lamp is supported so that it may be swung upwardly from an inoperative position in the lower portion of the pocket into an operative position wherein the lens thereof projects through the opening and faces forwardly, a plate of the same shape as the opening connected to the top portion of the shell and extending rearwardly and at an acute angle with respect to the lens and arranged so that it serves to close the opening when the lamp is in its inoperative position and further so that when the lamp is swung into its operative position it swings upwardly and the rear portion thereof projects into the pocket and overhangs said mounting, and a bar-like member extending across and secured fixedly to the central portion of the inner face of the plate and having the ends thereof attached to the side portions of the shell.

4. In a headlight structure for a vehicle, the combination of a pocket located at the front of the vehicle and provided with a front opening, an electric lamp associated with the pocket and comprising a lens, a reflector in back of the lens, and a shell around the reflector, a mounting in the pocket for supporting the lamp so that it may be swung upwardly from an inoperative position in the lower portion of the pocket into an operative position wherein the lens thereof extends through the opening and faces forwardly, comprising a horizontal, rotatable shaft extending across the back of the reflector and having arm-like elements at the ends thereof connected to opposed portions of the shell, a plate of the same shape as the opening connected to the top portion of the shell and extending rearwardly and at an acute angle with respect to the lens and arranged so that it serves to close the opening when the lamp is in its inoperative position and further so that when the lamp is swung into its operative position it swings upwardly and the rear portion thereof projects into the pocket and overhangs said shaft, and a bar-like member extending across and secured fixedly to the central portion of the inner face of the plate and having the ends thereof connected to said arm-like elements.

5. In a headlight structure for a vehicle, the combination of a pocket located at the front of the vehicle and provided with a front opening, an electric lamp associated with the pocket and comprising a lens, a reflector in back of the lens and a shell extending around said reflector, a mounting in the pocket for supporting the lamp so that it may be swung from an inoperative position in the pocket into an operative position wherein the lens thereof extends through the opening and faces forwardly, comprising a rotatable shaft extending across the back of the reflector and having arm-like elements at the ends thereof connected to opposed portions of the shell, and means for swinging the lamp into and out of its operative position comprising a worm and worm gear connection applied to one of said elements.

6. In a headlight structure for a vehicle, the combination of a pocket located at the front of the vehicle and provided with an opening therein, an electric lamp associated with the opening and comprising a lens, a reflector in back of the lens and a shell extending around said reflector, a mounting in the pocket for supporting the lamp so that it may be swung from an inoperative position in the pocket into an operative position wherein the lens thereof extends through the opening and faces forwardly, comprising a rotatable shaft extending across the back of the reflector and having arm-like elements at the ends thereof positioned adjacent to opposed portions of the shell, and connections between said opposed portions of the shell and the arm-like elements whereby the lamp may be adjusted horizontally when in its operative position.

7. In a headlight structure for a vehicle, the combination of a pocket located at the front of the vehicle and provided with an opening therein, an electric lamp associated with the pocket, a mounting in the pocket for supporting the lamp so that it may be swung from an inoperative position in the pocket into an operative position wherein it extends through the opening and vertically faces forwardly comprising a rotatable shaft and a pair of arm-like members extending between and connected to the ends of the shaft and opposite portions of the lamp, and adjustable means coacting with one of said arm-like elements for stopping swing of the lamp when it reaches its said operative position.

8. In a headlight structure for a vehicle, the combination of a pocket located at the front of the vehicle and provided with a forwardly facing opening, an electric lamp associated with the pocket and comprising a substantially circular lens and a concavo convex reflector behind the lens, and a mounting adapted to support the lamp so that it may be swung from an inoperative position within the pocket into an operative position wherein the lens thereof is disposed exteriorly of the opening and faces forwardly, and comprising a bearing bracket secured fixedly in the pocket and a pivot shaft in the bearing of the bracket and directly behind the central portion of the reflector connected to the side portions of the lamp by arm-like members at the ends thereof and disposed in a substantially diametric position with respect to the lens so that when the lamp is in its operative position the air impinging against that half of the lens which is at one side of the shaft is counterbalanced by the air impinging against the other half of the lens and hence does not tend to rotate the lamp from its operative position.

9. In a headlight structure for a vehicle, the combination of a pocket located at the front of the vehicle and provided with a forwardly facing opening, an electric lamp associated with the pocket and comprising a substantially circular lens and a concavo convex reflector behind the lens, and a mounting adapted to support the lamp so that it may be swung substantially vertically from an inoperative position within the pocket into an operative position wherein the lens thereof is disposed exteriorly to the opening and faces forwardly, and comprising a bearing bracket fixedly secured in the pocket and a horizontal pivot shaft in the bearing of the bracket and directly behind the central portion of the reflector connected at the ends thereof to the side portions of the lamp by rigid arm-like members normal to the lens, and disposed in a substantially diametric position with respect to the lens so that when the lamp is in its operative position the air impinging against that half of the lens which is at one side of the shaft is counterbalanced by the air impinging against the other half of the lens and hence does not tend to rotate the lamp from its operative position.

10. The combination with an automobile having a front fender with a downwardly inclined front wall and an opening in said front wall beneath the fender top, of a pocket disposed under the fender and in back of and registry with the opening, an electric lamp associated with the pocket and comprising a lens and a concavo convex reflector opposite to the lens, and a mounting in the pocket whereby the lamp is supported for rotation on a horizontal axis which is spaced a small distance behind and is positioned centrally with respect to the central part of the reflector and permits the lamp to be swung upwardly from an inoperative position wherein it is disposed wholly within the pocket and the lens thereof faces downwardly into an operative forwardly facing position wherein the lens thereof and a portion of the reflector are positioned outside of the opening and are disposed beneath the top of the fender.

HERBERT C. SNOW.